UNITED STATES PATENT OFFICE.

WILLIAM CHADWICK, THOMAS CHADWICK, AND JAMES CHADWICK, OF MANCHESTER, AND JOSIAH W. KYNASTON, OF LIVERPOOL, ENGLAND.

PROCESS FOR THE PURIFICATION OF ALUMINA, BAUXITE, &c.

SPECIFICATION forming part of Letters Patent No. 228,867, dated June 15, 1880.

Application filed October 29, 1879.

*To all whom it may concern:*

Be it known that we, WILLIAM CHADWICK, THOMAS CHADWICK, and JAMES CHADWICK, all of Manchester, and JOSIAH WICKLIFFE KYNASTON, of Liverpool, both places being in the county of Lancaster, in the Kingdom of England, have invented a new and useful Process for the Purification of Alumina, Bauxite, &c., which process is fully set forth in the following specification.

Bauxite and other forms of alumina or hydrate of alumina are greatly deteriorated in value, especially for the manufacture of sulphate of alumina or of aluminium, by the presence of oxide of iron. It is for the elimination of this impurity that this process is designed.

We take bauxite or hydrate of alumina (or other aluminous material suitable for making sulphate of alumina by the addition of sulphuric acid) and reduce it to an extremely fine powder and mix it with a solution of oxalic acid, and, if there be lime in the bauxite, hydrochloric acid also, in the proportion of one hundred bauxite, five to ten of oxalic acid, and five to ten of hydrochloric acid, the exact quantities depending on the amount of iron or lime contained in the bauxite, the hydrochloric acid being used to hold the lime oxalates in solution and to prevent the formation of insoluble oxalate.

We allow the mixture to stand at rest, or with occasional stirring, for a week or ten days. We then add five or six times as much water as the bulk of the mixture, thoroughly agitate, and allow to stand till the hydrate of alumina is deposited. The latter is again repeatedly washed until quite free from oxalic acid. We make of this purified bauxite sulphate of alumina or aluminous cake by the well-known process in common use, and we obtain a product containing not more than from 0.10 to 0.20 per cent. of iron.

We take the strongly-acid solution of oxalate of iron (containing also some alumina) obtained in this process of purification and add to it milk of lime considerably more than equivalent to the oxalic acid present, but still leaving the mixture strongly acid. After standing two or three days the oxalic acid is thus almost perfectly precipitated as oxalate of lime. This precipitate is well washed and then boiled with its equivalent of sulphuric acid.

The sulphate of lime produced is allowed to settle out, and a clear solution of oxalic acid is again obtained for the purification of a second portion of bauxite, as before described.

We claim as our invention—

1. The process for separating iron from aluminous materials, such as bauxite or clay, which consists in converting the iron into a soluble oxalate and removing the said oxalate by filtration and decantation, as set forth.

2. The herein-described process of purifying bauxite, clay, and other aluminous minerals from oxide of iron, which consists in reducing them to a finely-comminuted state and then mixing them with a solution of oxalic acid, allowing the mixture to stand, and then separating the solid from the liquid ingredients by decantation and filtration, as set forth.

WILLIAM CHADWICK.
THOMAS CHADWICK.
JAMES CHADWICK.
JOSIAH WICKLIFFE KYNASTON.

Witnesses:
EDWARD NOAR,
ORLANDO HAIGH HULME.